(12) United States Patent
Hu

(10) Patent No.: US 12,160,733 B2
(45) Date of Patent: Dec. 3, 2024

(54) POWER SAVING METHOD FOR LOWER POWER DEVICES, ELECTRONIC DEVICE AND COMPUTER READABLE STORAGE MEDIUM

(71) Applicant: CyberTAN Technology, Inc., Hsinchu (TW)

(72) Inventor: Cheng-Wei Hu, Hsinchu (TW)

(73) Assignee: CyberTAN Technology, Inc., Hsinchu (TW)

( * ) Notice: Subject to any disclaimer, the term of this patent is extended or adjusted under 35 U.S.C. 154(b) by 248 days.

(21) Appl. No.: 17/826,652

(22) Filed: May 27, 2022

(65) Prior Publication Data

US 2023/0388791 A1    Nov. 30, 2023

(51) Int. Cl.
*H04W 12/0471* (2021.01)
*G16Y 40/50* (2020.01)
*H04W 84/18* (2009.01)
*G16Y 30/00* (2020.01)

(52) U.S. Cl.
CPC ......... *H04W 12/0471* (2021.01); *G16Y 40/50* (2020.01); *H04W 84/18* (2013.01); *G16Y 30/00* (2020.01)

(58) Field of Classification Search
CPC .. H04W 12/0471; H04W 48/18; G16Y 40/50; G16Y 30/00
See application file for complete search history.

(56) References Cited

U.S. PATENT DOCUMENTS

| | | | |
|---|---|---|---|
| 2017/0250974 A1* | 8/2017 | Antonyraj | H04W 12/50 |
| 2020/0036792 A1* | 1/2020 | Palin | H04W 4/80 |
| 2021/0250760 A1* | 8/2021 | Yoshida | H04W 12/0431 |

* cited by examiner

*Primary Examiner* — Normin Abedin
(74) *Attorney, Agent, or Firm* — ScienBiziP, P.C.

(57) ABSTRACT

A power saving method for lower-power devices is disclosed. Unencrypted IoT packets are received from low-power sensors. An identity of a mobile device is registered and public keys are exchanged between an MQTT agent and the mobile device. An advanced encryption standard (AES) key is generated according to public and private keys of the MQTT agent and a public key of the mobile device and received IoT packets are encrypted using the AES key. The encrypted IoT packets are transmitted to an MQTT broker. The MQTT broker forward the encrypted IoT packets to the mobile device. The mobile device exchanges the AES key with the electronic device according to its own public key through the secure shell (SSH) mechanism. The mobile device decrypts the IoT packets through the AES key.

6 Claims, 7 Drawing Sheets

POWER SAVING METHOD FOR LOWER POWER DEVICES, ELECTRONIC DEVICE AND COMPUTER READABLE STORAGE MEDIUM

BACKGROUND

1. Technical Field

The disclosure relates to network connections, and more particularly to a power saving method for lower-power devices.

2. Description of Related Art

The Internet of Things (IoT) technology is widely used, and most of terminal devices used in the IoT are low-power devices, which are requested to report information at a fixed point for a long time. With the popularity of IoT applications, security requirements are becoming higher, especially for commercial applications such as manufacturing and transportation. In addition, due to the need for frequent reporting of information, energy consumption is also an important issue.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

Figure 1:
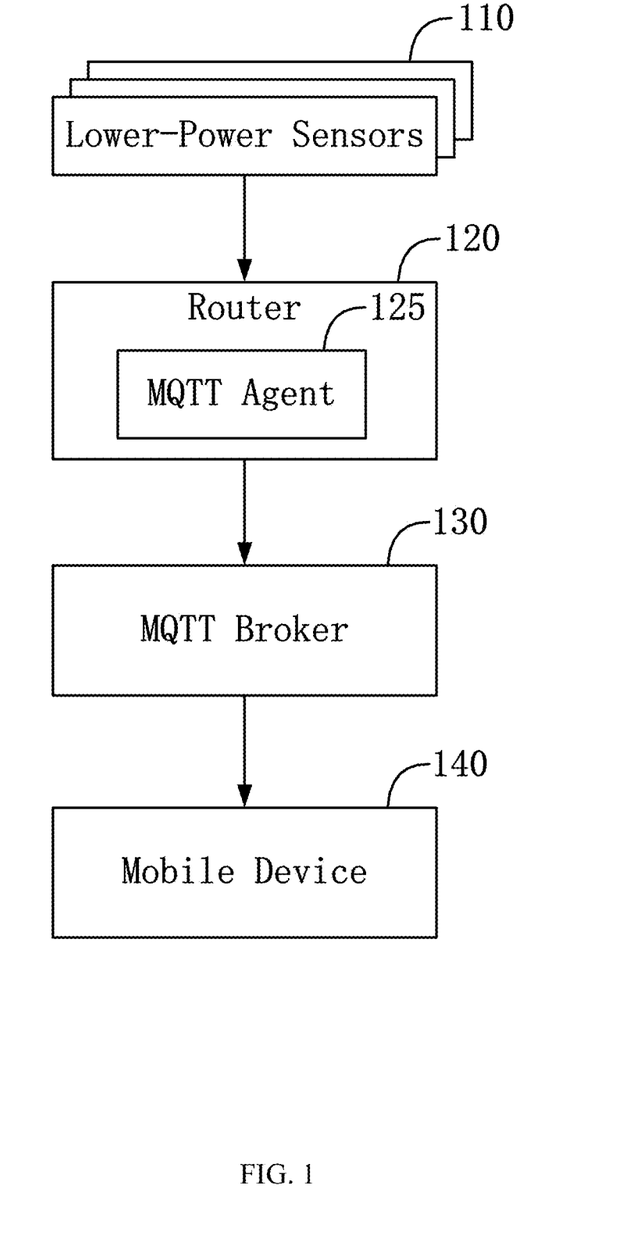
FIG. 1 is a schematic diagram of an embodiment of a structure of a power saving system for lower-power devices of the present disclosure.

FIG. 1 is a schematic diagram of an embodiment of a structure of a power saving system for lower-power devices of the present disclosure.

An embodiment of a power saving system for lower-power devices 100 of the present disclosure comprises multiple lower-power sensors 110, a router 120, a message queuing telemetry transport (MQTT) broker 130 and a mobile device 140. The router 120 further comprises an MQTT agent 125. In an embodiment of the present disclosure, the MQTT agent 125 performs packet encryption decryption operations which are originally performed by the MQTT broker 130, providing the following advantages for the low-power devices:

(1) The energy consumption is reduced and transmission efficiency is increased.

The low-power sensors 110 have the characteristics of power saving and long standby time. If the encrypted connection mechanism needs to be re-established with the MQTT Broker 130 as IoT packets are transmitted, a lot of extra power is required as the time passes for a long time. If the encryption and re re-establishment tasks are passed to be performed by the MQTT agent 125, the computational power consumption required for encrypting and re-establishing the connection can be reduced.

(2) The security of communication is increased.

The communication between the MQTT agent 125 and the mobile device 140 belongs to point-to-point encryption and is not afraid of being eavesdropped, even if the MQTT broker 130 is hacked, there is no need to worry about information contents being stolen.

(3) The computational bottleneck of the MQTT broker 130 is reduced.

Since the security encryption mechanism of the communication is carried between the MQTT agent 125 and the mobile device 140, the MQTT broker 130 can concentrate on the work of packet distribution, which can greatly reduce the computing load.

Figure 2:
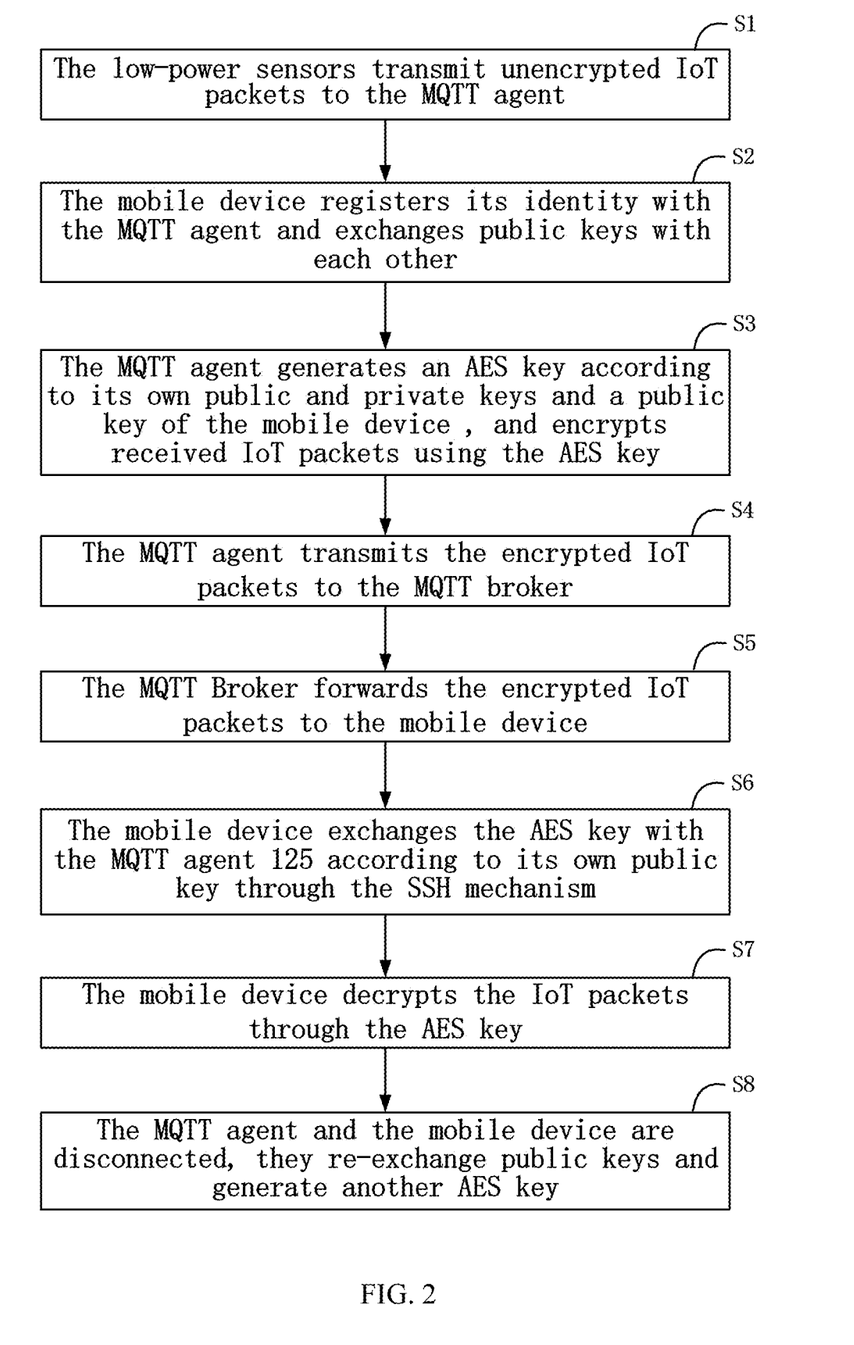
FIG. 2 is a flowchart of an embodiment of a power saving method for lower-power devices of the present disclosure.

FIG. 2 is a flowchart of an embodiment of a power saving method for lower-power devices of the present disclosure. According to different needs, the order of the steps in the flowchart can be changed, and some steps can be omitted.

In step S1, the low-power sensors 110 transmit unencrypted IoT packets to the MQTT agent 125.

In step S2, The mobile device 140 registers its identity with the MQTT agent 125 and exchanges public keys with each other.

In step S3, the MQTT agent 125 generates an advanced encryption standard (AES) key according to its own public and private keys and a public key of the mobile device 140, and encrypts received IoT packets using the AES key.

In step S4, the MQTT agent 125 transmits the encrypted IoT packets to the MQTT broker 130.

In step S5, the MQTT Broker 130 forwards the encrypted IoT packets to the mobile device 140.

In step S6, the mobile device 140 exchanges the AES key with the MQTT agent 125 according to its own public key through the secure shell (SSH) mechanism.

In step S7, the mobile device 140 decrypts the IoT packets through the AES key.

In step S8, when the MQTT agent 125 and the mobile device 140 are disconnected, they re-exchange public keys and generate another AES key.

Figure 3:
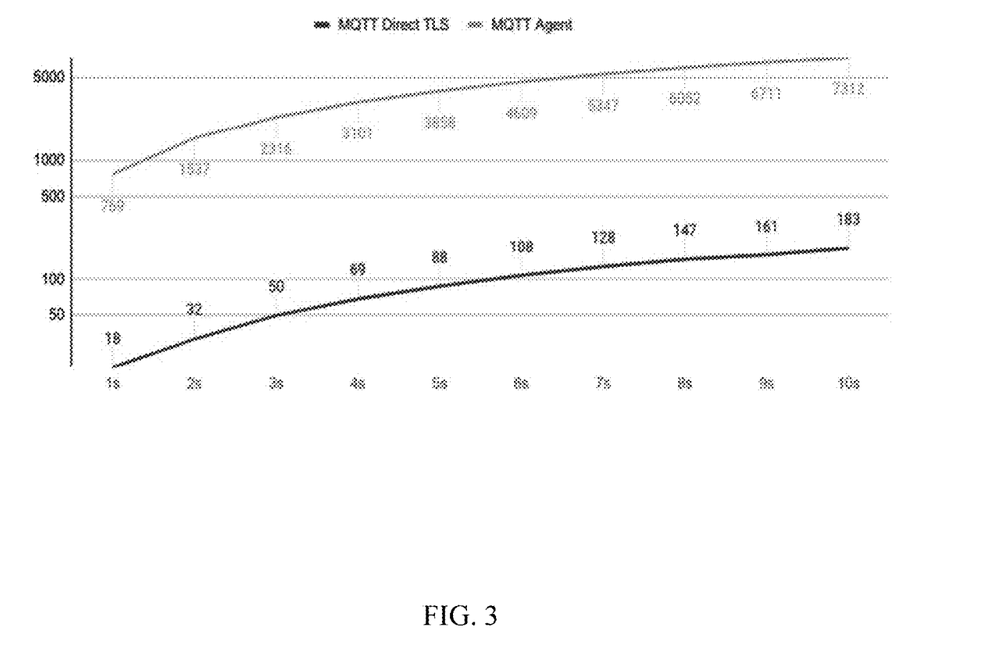
FIG. 3 is a curve diagram of an embodiment of an accumulated number of times of packets transmitted by an MQTT agent under a non-encryption mode.
Figure 4:
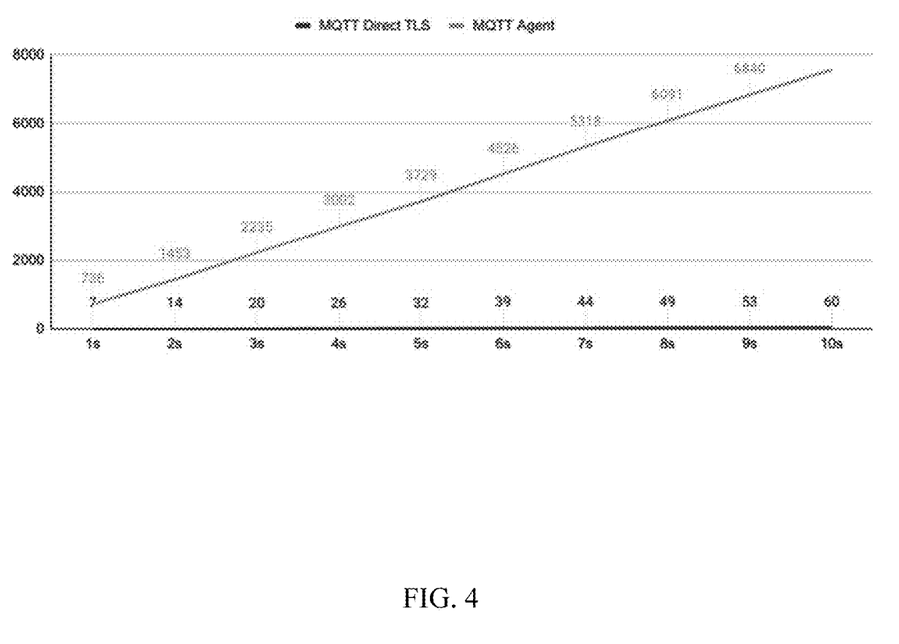
FIG. 4 is a curve diagram of an embodiment of an accumulated number of times of packets transmitted by an MQTT agent under an encryption mode.
Figure 5:
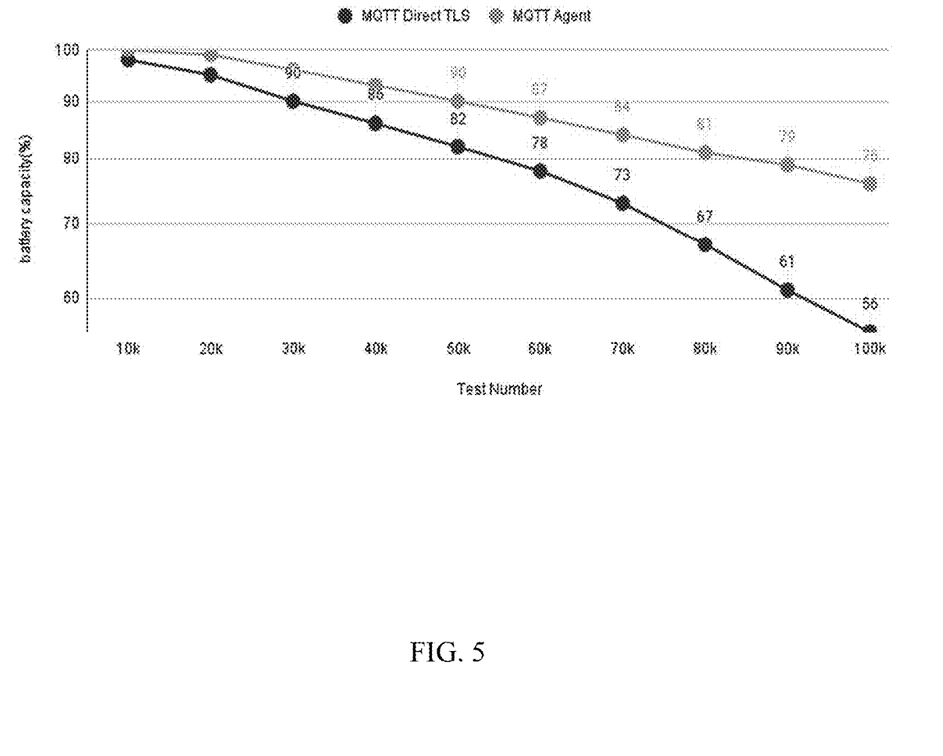
FIG. 5 is a schematic diagram of power consumption comparison between a traditional method, such as MOTT Direct TLS, and the present disclosure, such as MOTT Agent.

FIGS. 3-5 are curve diagrams of embodiments of simulation verification data of the MQTT agent 125 of the present disclosure. FIG. 3 is a curve diagram of an embodiment of an accumulated number of times of packets transmitted by an MQTT agent under a non-encryption mode. FIG. 4 is a curve diagram of an embodiment of an accumulated number of times of packets transmitted by an MQTT agent under an encryption mode. FIG. 5 is a curve diagram of power consumption comparison between a traditional method, such as MOTT Direct TLS, and the present disclosure, such as MOTT Agent.

Figure 6:
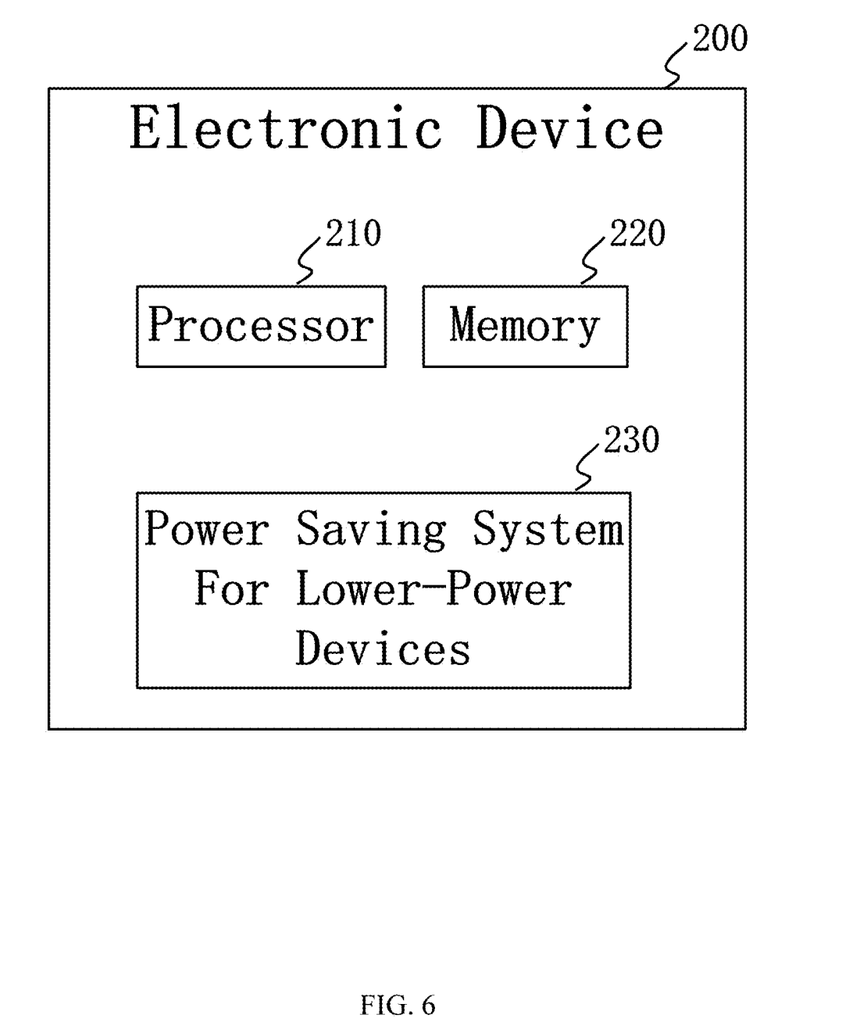
FIG. 6 is a block diagram of an embodiment of the hardware architecture of an electronic device using the method of the present disclosure.

FIG. 6 is a block diagram of an embodiment of the hardware architecture of an electronic device using the power saving method for lower-power devices of the present disclosure. The electronic device 200 may be, but is not limited to, connected to a processor 210, a memory 220, and a power saving system for lower-power devices 230 via system buses. The electronic device 200 shown in FIG. 6 may include more or fewer components than those illustrated, or may combine certain components.

The memory 220 stores a computer program, such as the power saving system for lower-power devices 230, which is executable by the processor 210. When the processor 210 executes the power saving system for lower-power devices 230, the blocks in one embodiment of the booting mode configuration method applied in the electronic device 200 are implemented, such as blocks S11 to S17 shown in FIG. 1 and blocks S201 to S216 shown in FIG. 2.

It will be understood by those skilled in the art that FIG. 6 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the power saving system for lower-power devices 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The power saving system for lower-power devices 230 can be partitioned into one or more modules/units that are stored in the memory 220 and executed by the processor 210. The one or more modules/units may be a series of computer program instructions capable of performing particular functions of the power saving system for lower-power devices 230.

Figure 7:
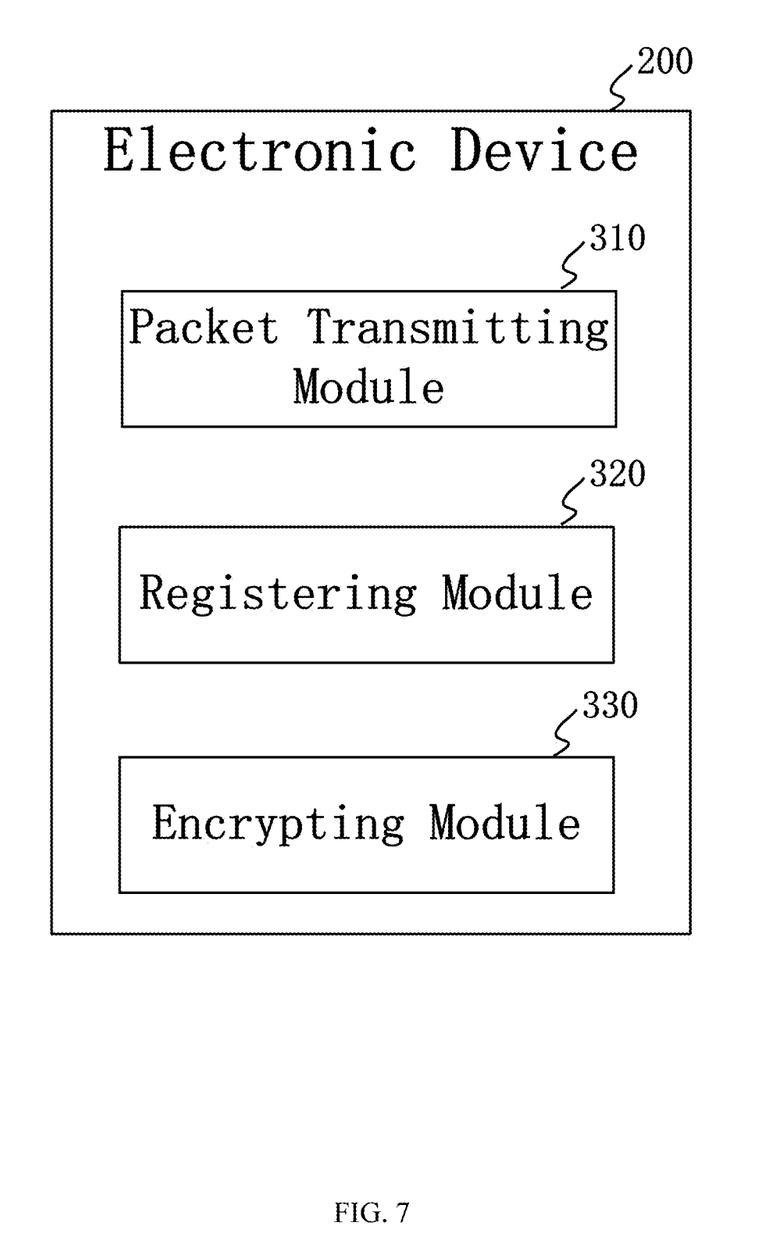
FIG. 7 is a block diagram of an embodiment of functional blocks of the electronic device using the method of the present disclosure.

FIG. 7 is a schematic diagram of an embodiment of functional blocks of the electronic device using the method of the present disclosure. The electronic device 200 comprises a packet transmitting module 310, a registering module 320 and an encrypting module 330.

The packet transmitting module 310 receives unencrypted IoT packets from the low-power sensors 110.

The registering module 320 registers an identity of the mobile device 140 and exchanges public keys with each other.

The encrypting module 330 generates an AES key according to its own public and private keys and a public key of the mobile device 140, and encrypts received IoT packets using the AES key.

The packet transmitting module 310 transmits the encrypted IoT packets to the MQTT broker 130.

The MQTT Broker 130 forwards the encrypted IoT packets to the mobile device 140.

The mobile device 140 exchanges the AES key with the encrypting module 330 according to its own public key through the SSH mechanism.

The mobile device 140 decrypts the IoT packets through the AES key.

In step S8, when the MQTT agent 125 and the mobile device 140 are disconnected, the encrypting module 330 re-exchange public keys with the mobile device 140 and generate another AES key.

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:

1. A power saving method for lower-power devices executable by an electronic device, comprising:
   receiving unencrypted IoT packets from low-power sensors;
   registering an identity of a mobile device and exchanging public keys between the electronic device with the mobile device;
   generating an advanced encryption standard (AES) key according to public and private keys of the electronic device and a public key of the mobile device and encrypting received IoT packets using the AES key; and
   transmitting the encrypted IoT packets to an MQTT broker;
   wherein:
   the MQTT broker forwards the encrypted IoT packets to the mobile device;
   the mobile device exchanges the AES key with the electronic device according to the public key thereof through the secure shell (SSH) mechanism; and
   the mobile device decrypts the IoT packets through the AES key.

2. The method of claim 1, further comprising:
when the electronic device and the mobile device are disconnected, re-exchanging the public keys of the electronic device and the mobile device and generating another AES key according to the public keys.

3. An electronic device comprising:
a packet transmitting module configured to receive unencrypted IoT packets from low-power sensors;
a registering module configured to register an identity of a mobile device and exchanges public keys with each other;
an encrypting module configured to generate an AES key according to public and private keys thereof and a public key of the mobile device, and encrypt received IoT packets using the AES key; and
a packet transmitting module configured to transmits the encrypted IoT packets to an MQTT broker;
wherein:
the MQTT broker forwards the encrypted IoT packets to the mobile device;
the mobile device exchanges the AES key with the encrypting module according to the public key thereof through the SSH mechanism; and
the mobile device decrypts the IoT packets through the AES key.

4. The device of claim 3, wherein:
when the electronic device and the mobile device are disconnected, the encrypting module re-exchanges public keys with the mobile device and generate another AES key according to the public keys.

5. A non-transitory computer-readable storage medium storing game program which causes a computer to execute:
a process of receiving unencrypted IoT packets from low-power sensors;
a process of registering an identity of a mobile device and exchanging public keys between the electronic device with the mobile device;
a process of generating an advanced encryption standard (AES) key according to public and private keys of the electronic device and a public key of the mobile device and encrypting received IoT packets using the AES key; and
a process of transmitting the encrypted IoT packets to an MQTT broker;
wherein:
the MQTT broker forwards the encrypted IoT packets to the mobile device;
the mobile device exchanges the AES key with the electronic device according to the public key thereof through the SSH mechanism; and
the mobile device decrypts the IoT packets through the AES key.

6. The non-transitory computer-readable storage medium of claim 5, further comprising:
a process of, when the electronic device and the mobile device are disconnected, re-exchanging the public keys of the electronic device and the mobile device and generating another AES key according to the public keys.

* * * * *